Nov. 21, 1950 R. E. HAWKINSON 2,531,126
DENTAL FORCEPS
Original Filed May 29, 1946

INVENTOR.
Roy E. Hawkinson.
BY
Harness, Dickey & Pierce.
ATTORNEYS.

Patented Nov. 21, 1950

2,531,126

UNITED STATES PATENT OFFICE 2,531,126

DENTAL FORCEPS

Roy E. Hawkinson, Bloomfield Hills, Mich.

Original application May 29, 1946, Serial No. 672,971. Divided and this application March 4, 1948, Serial No. 12,989

1 Claim. (Cl. 32—62)

This invention relates generally to dental apparatus and more particularly to dental forceps adapted for use with dental matrices or the like.

This application is a division of my copending application on improvements for Dental Impression Accessory, Serial No. 672,971, filed May 29, 1946, now Patent No. 2,450,591.

Dentists in making inlays for a tooth make an impression of the cavity with wax, and in doing this the wax is usually applied to a metal backing member usually termed a matrix, which is used not only as a support for the wax but as a backing member for the wax so that it may be forced firmly into the cavity and the metal backing member brought toward a flush relationship with the surface of the tooth to fully determine the size, shape and contour of the cavity. These metal backing members present a problem as far as manipulation is concerned and the matrix construction illustrated in my copending application, aforementioned, permits the materix to be directed in its application, when a pressure is applied through forceps or the like, while at the same time permitting the proper application of pressure without danger of trembling of the dentist's hand or arm causing an imperfect impression to be obtained. It is therefore desirable to provide, with matrices of this type, forceps which will permit easier manipulation and permit a perfect dental impression to be obtained.

It is therefore an object of this invention to provide dental forceps which may be used generally with dental apparatus and particularly, with dental matrices of the type illustrated in my copending application, so as to permit the taking of perfect tooth impressions in a relatively simple manner.

It is a further object of this invention to provide forceps having relatively pivotal jaws and a forwardly facing shoulder on the inner surface of one of the jaws adjacent the outer end thereof, for use with the aforementioned dental matrices, so as to permit the application of pressure and the proper control for the positioning of the dental matrix and thus permit a perfect dental impression to be made.

These and other objects of this invention will become apparent from the following detailed description taken in conjunction with the accompanying drawing in which Figure 1 is a fragmentary perspective view of the dental forceps of this invention grasping the sides of the rib of a matrix;

Figure 1:
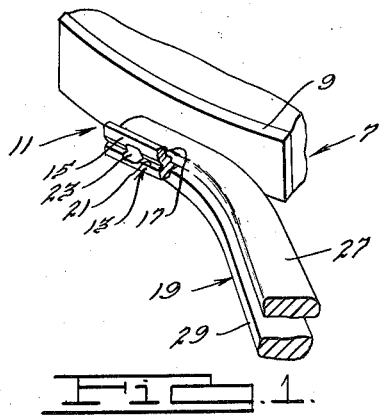
Figure 2:
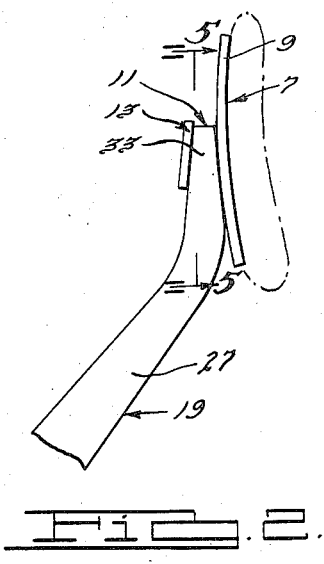
Fig. 2 is a side elevational view of the embodiment illustrated in Fig. 1.

As can be best seen in Fig. 1, a matrix 7 comprises a plate 9 made of a thin ductile material capable of being easily cut in a dentist's office by scissors, shears, or the like so as to fit the contour of any tooth or cavity therein. An upstanding rib 11 is rigidly secured to the center of the plate 9. The upper end of the rib 11 is formed into a head 13 having longitudinally overhanging flanges 15 in relation to the rib. The lower surface of the flanges 15 and the upper surface of the plate 9 form longitudinal grooves 17 along each side of the rib 11. These grooves 17, as can be seen in Figs. 1 and 2, are adapted to receive the ends of dental forceps 19, which will be described hereinafter in detail, so as to provide holding means for the matrix when positioning it relative to a tooth, and prevent the forceps from pulling off the rib when removing the plate and impression from the cavity. A groove 21 extends longitudinally and centrally along the top of the rib head 13 and in the center of the groove 21 a hole or depression 23 is preferably provided adapted to receive the outer ends of the forceps, as will be described.

The forceps 19 may be of any of the well-known pivoted or spring jaw types but are shown in the drawing as being of the spring jaw type, having a pair of jaws 27 and 29 which terminate at one end in a handle or head portion 31, and the opposite ends of which are tapered so as to be blunt and generally rectangularly sectioned at their extremities, as indicated at 33. The tapered ends are thus strong and rigid, and not flexible or wobbly, so that pressure may be applied to the matrix, through the forceps, in a positive manner. The tapered ends 33 of the jaws 27 and 29 extend angularly and somewhat arcuately with respect to the intermediate jaw portions so as to fit into the matrix rib grooves 17 between the rib head 13 and matrix plate 9. Thus the tapered jaw ends 33 will fit snugly into the grooves 17, on opposite sides of the rib, so that the upper faces thereof will engage the underside of the rib head, and the bottom faces thereof will engage the matrix plate 9, as shown in Fig. 2. One jaw, such as jaw 27 of the forceps, is provided with a forwardly facing shoulder 35 on the inside surface at the tapered end 33 thereof so that when the forceps are positioned in the grooves 17 along the sides of the rib, the shoulder 35 will abut against the rear portion of the rib 11 and prevent any slippage which might occur if no shoulder were provided, when pressure is applied longitudinally of the forceps. The tapered forcep ends 33, when inserted in the grooves 17, thus become in effect almost an integral part thereof so that when the forceps are used with the matrix shown, and various other types of matrices, pressure may be applied to the matrix rib without danger of slippage of the forceps which might cause an imperfect dental impression to be taken. The forceps therefore cooperate with the matrix rib to permit the dentist to make a perfect dental impression without danger of slippage or worry of hand trembling or the like.

Figure 3:
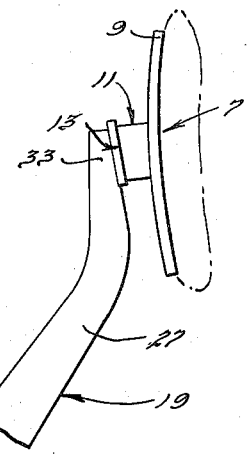
Fig. 3 is a side view of the embodiment shown in Fig. 1 showing the forceps applied to a groove in the top of the rib of the matrix.
Figure 4:
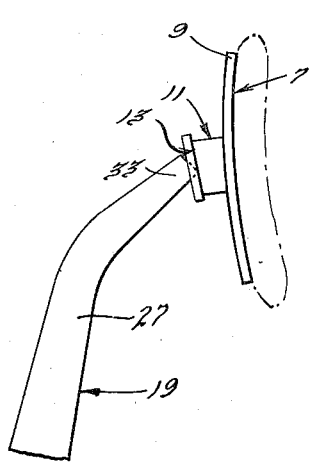
Fig. 4 is a side view of the embodiment shown in Fig. 1 showing the point of the forceps inserted in a depression in the top of the matrix rib.
Figure 5:
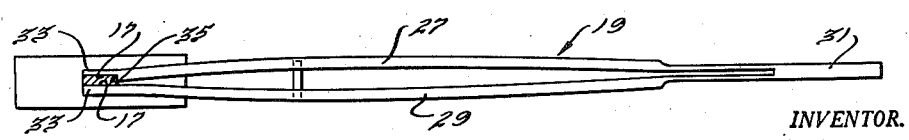
Fig. 5 is a reduced view partially in section and partially in elevation of the structure illustrated in Fig. 2 taken along the line 5—5 thereof.

The forceps are so constructed and dimensioned that the tapered ends 33 of the jaws 27 and 29 may be positioned in the central depression 23 of the rib, as shown in Fig. 4, to permit direct pressure against the tooth to be applied again without danger of slippage. Likewise, as the underside of the tapered end portions of the forceps jaws 27 and 29 are flat and extend at an angle with respect to the intermediate portion of the jaws 27 and 29, the lower faces of the tapered ends can be placed in the central longitudinal groove 21 of the matrix rib, as shown in Fig. 3, to again permit pressure to be applied against a tooth without the dentist worrying about any trembling of his hand or slippage which might cause an imperfection in the impression.

After the wax is forced into the cavity of the tooth by the matrix and forceps, the tapered end of the forceps can be removed from the top of the matrix rib 11 and placed around the side of the rib in the grooves 17. The matrix and wax can be removed from the tooth without damaging the wax impression which has been formed. During the removal of the matrix, the engagement of the ends 33 of the forceps with the underside of the rib head 13 serves to prevent the forceps from slipping off the rib 17 and injuring the person's mouth in which the impression is being made.

It will thus be appreciated that the forceps of this invention, while being adapted for general use with various types of dental matrices, are particularly adapted for use with dental matrices of the type illustrated in the aforementioned co-pending application, and cooperate with such matrices to permit the taking of wax impressions of a tooth or tooth cavity in a much more efficient manner than has heretofore been possible in the art.

I claim:

Dental apparatus comprising forceps including relatively movable jaws having tapered outer ends extending angularly with respect to the intermediate portion of said jaws so as to be adapted to snugly fit between a matrix plate and overhanging portions on the outer end of a matrix rib extending angularly from the matrix plate, the bottom faces of said tapered ends being substantially flat so as to be capable of lying substantially flat against a portion of the top of the rib of the dental matrix, and a forwardly facing shoulder on the inner surface of one of said jaws adjacent the outer extremity of the tapered outer end thereof adapted to abut a portion of the matrix rib.

ROY E. HAWKINSON.

REFERENCES CITED

The following references are of record in the file of this patent:

UNITED STATES PATENTS

| Number | Name | Date |
|---|---|---|
| 951,860 | Wallace | Mar. 15, 1910 |

FOREIGN PATENTS

| Number | Country | Date |
|---|---|---|
| 208,848 | Switzerland | May 16, 1940 |